Patented Apr. 19, 1949

2,467,796

UNITED STATES PATENT OFFICE 2,467,796

THERMOPLASTIC COMPOSITIONS COMPRISING CANDELILLA WAX

Hilary B. Willis, Pittsburgh, Pa., assignor to Westinghouse Electric Corporation, East Pittsburgh, Pa., a corporation of Pennsylvania No Drawing. Application June 11, 1948,
Serial No. 32,545

4 Claims. (Cl. 106—231)

This invention relates to thermoplastic compositions particularly suitable for the making of patterns for casting and like purposes.

In the making of castings by the lost wax process, a pattern corresponding to the desired casting is prepared and invested in a slurry of a refractory mold material. After the refractory mold material has been dried and hardened so that it will retain its shape upon removal of the wax pattern, the wax pattern is removed, usually by melting, thereby leaving a cavity corresponding to the shape of the wax pattern in the investment which may be filled with molten metal.

Where the same casting is to be duplicated a number of times, it is the practice to prepare one or more master molds having a cavity corresponding to the shape of desired casting and to use such molds repeatedly in the preparation of the required number of wax patterns. If the mold cavity is of a complicated shape, the wax pattern must be removable therefrom by a slight springing or giving without formation of cracks or breaking apart. After being introduced in the molten state into the mold, the wax must solidify with a minimum of shrinkage, preferably without any shrinkage at all, so that the surface texture and shape of the mold is retained accurately. The compositions used in making the wax patterns must be of a sufficiently high melting point so that the patterns may be stored at room temperature without distortion occurring. Furthermore, the wax pattern must be tough so that it may be invested with the hardenable refractory mold composition without distortion or breakage.

While many wax compositions for practice in such processes have been proposed heretofore, it has been found that many of the compositions lack elasticity and toughness. Therefore, upon a removal from the mold or during removal from the mold, they break or crack or are distorted because they have no elasticity. Other compositions were non-homogeneous and the composition varied so that their utility was affected. Furthermore, after having been invested, such prior art compositions frequently leave a residue or ash within the investment cavity, thereby interfering with a satisfactory metal casting produced thereafter in the investment.

The object of the present invention is to provide a tough elastic thermoplastic composition comprising candelilla wax and a resinous reaction product, which is unusually well suited for use in the making of patterns therefrom for use in the lost wax process.

Other objects of the invention will in part be obvious and in part appear hereinafter.

It has been discovered that a thermoplastic composition suitable for use in making of patterns may be prepared by combining from 60% to 88% by weight of candelilla wax and from 40% to 12% by weight of a reaction product of rosin, glycerol and a drying or semi-drying oil, the reaction product having a viscosity of between 6,000 and 22,000 centipoises at 100° C. The reaction product may be prepared in any one of several ways. A convenient method of preparing the reaction product is to heat between 20 to 40 parts by weight of ester gum of an acid number between 2 and 40 and between 80 and 60 parts by weight, the total being 100 parts, of a drying or semi-drying oil until the desired viscosity has been reached. The reaction product also may be prepared by heating rosin and glycerol in proportions which would produce ester gum of an acid number of between 2 and 40 simultaneously with the drying or semi-drying oil. Alternatively, the rosin and an unsaturated fatty acid, having from 16 to 22 carbon atoms, may be combined as a previously prepared or naturally obtainable material, which material is then heated with the proper amount of glycerol. Suitable fatty acids are oleic acid, linoleic acid, linolenic acid, ricinoleic acid, and erucic acid.

Examples of drying and semi-drying oils that may be combined with the low acid number ester gum are linseed oil, cashew nut shell oil, tung oil, soybean oil, dehydrated castor oil, sunflower seed oil, fish oil, hempseed oil, and perilla oil. Mixtures of two or more drying or semi-drying oils may be employed.

In practicing the invention, the best results have been obtained by combining the reaction product of rosin, glycerol and the drying oil with candelilla wax alone. However, up to 10% of the candelilla wax may be replaced by an equal weight of another wax having a melting point of over 50° C. Examples of such other waxes are carnauba wax, montan wax, bayberry wax and beeswax.

The following examples are illustrative of the preparation of the thermoplastic compositions of this invention.

Example I 200 parts by weight of ester gum of an acid number of between 6 and 8 was admixed with 800 grams of raw linseed oil, and the mixture was heated at 275° C. for sixteen hours. The heating was terminated when the product had a viscosity of 7,000 centipoises at 100° C. Various compositions were prepared by admixing from 25 to 15 parts of this reaction product with from 75 to 80 parts by weight of molten candelilla wax at 125° C. The hot mixture was vigorously stirred in each case to insure a thorough solution of the reaction product in the candelilla wax. The hot composition upon filtering was ready for use. It could be maintained in the molten state for many days without showing any significant change in properties with only a small amount of oxidation inhibitor, for example, beta-naphthol, pyrogallol or diphenylamine, to prevent skinning.

Turbine blade patterns of the wax were cast from the compositions in a suitable mold, and they were all satisfactorily removed from the mold in which they were cast. The wax patterns of the turbine blades were sufficiently elastic so that they could be bent slightly in removal from the mold without cracking or otherwise being permanently deformed. The wax patterns were invested in a hardenable refractory composition and heated to melt out the wax, any residue of wax being burned out. No ash or residue remained in the molds. Excellent metal turbine blade castings were then produced.

*Example II*

The reaction product of the ingredients of Example I was prepared to a viscosity of 18,000 centipoises at 100° C. and 25 parts of the reaction product was admixed with 75 parts of candelilla wax. It was found to produce excellent wax patterns.

*Example III*

200 grams of ester gum with an acid number between 6 and 8 was mixed in with 800 grams of soybean oil, and the mixture was heated for fourteen hours at a temperature of 275° C., followed by four hours at 235° C. The product then had a viscosity of slightly above 7000 centipoises at 100 C.

The reaction product of this example was admixed with molten candelilla wax at 125° C. in the proportions of from 75 to 85 parts by weight of candelilla wax to from 25 to 15 parts by weight of the reaction product. After a thorough admixture, the composition was filtered. A wide variety of wax patterns was cast from the resulting composition with highly successful results being secured in each case.

In another case the reaction product of this example reacted to a viscosity of 17,000 centipoises, was prepared and found to be satisfactory in admixture with candelilla wax.

*Example IV*

A solution was prepared by admixing 856 parts by weight of tall oil and 175 parts by weight of glycerol. After heating the solution at a temperature of 275° C. for twenty hours, the viscosity of the product was 10,000 centipoises at 100° C.

75 parts by weight of molten candelilla wax was admixed with 25 parts by weight of the reaction product of this example. The mixture was filtered after stirring to produce a homogeneous mixture. Satisfactory wax patterns were cast from the composition.

In each of the above examples, the compositions were found to produce no ash upon being invested in a ceramic material. Metal castings produced in the investments prepared by the use of the compositions herein disclosed were found to be of the highest precision and quality.

The use of the reaction product having a viscosity of from 6000 to 22,000 centipoises at 100° C. derived by reacting rosin glycerol and a drying or semi-drying oil is critical. I have found that a drying or semi-drying oil alone, even though bodied to this high a viscosity has very little beneficial effect on the candelilla wax, the candelilla wax by itself being unsuitable for the making of high grade patterns. Rosin alone tends to crystallize from out of the semi-drying or drying oil, no matter how introduced or treated. Mixtures with candelilla wax prepared from the last composition are unsatisfactory. A further indication of the critical nature of the composition is indicated by the fact that the reaction product of pentaerythritol with rosin and an oil fails to produce tough and elastic compositions when combined with candelilla wax.

The thermoplastic compositions of this invention may be poured manually into suitable molds of wood or metal in preparing wax patterns, or they may be applied by investing the wax under pressure into a mold. The resulting patterns on cooling will be found to be elastic and tough so that they enable the most desirable results to be secured in precision casting.

Since certain changes in carrying out the above processes and certain modifications in the compositions which embody the invention may be made without departing from its scope, it is intended that all the matter contained in the above description shall be interpreted as illustrative and not in a limiting sense.

I claim as my invention:

1. A tough, elastic thermoplastic composition suitable for use in the making of patterns composed of from 60% to 88% by weight of candelilla wax and from 40% to 12% by weight of the reaction product derived by heating together 18 to 36 parts by weight of rosin, glycerol in an amount of from 10% to 15% of the weight of the rosin and from 60 to 80 parts by weight of at least one oil selected from the group consisting of drying and semi-drying oils, the reaction product having a viscosity of between 6000 and 22,000 centipoises at 100° C.

2. A tough, elastic thermoplastic composition suitable for use in the making of patterns composed of from 60% to 88% by weight of candelilla wax and from 40% to 12% by weight of the reaction product derived by heating from 20 to 40 parts by weight of ester gum of an acid number of from 2 and 40 and from 80 to 60 parts by weight of at least one oil selected from the group consisting of drying and semi-drying oils, the reaction product having a viscosity of between 6,000 and 22,000 centipoises at 100° C.

3. A tough, elastic thermoplastic composition suitable for use in the making of patterns composed of from 60% to 88% by weight of candelilla wax and from 40% to 12% by weight of the reaction product derived by heating from 20 to 40 parts by weight of ester gum of an acid number of from 2 to 40 and from 80 to 60 parts by weight of linseed oil, the reaction product having a viscosity of between 6,000 and 22,000 centipoises at 100° C.

4. The composition of claim 1 wherein up to 10% of the candelilla wax is replaced by a wax melting above 50° C.

HILARY B. WILLIS.

No references cited.